(12) United States Patent
Kozodoi

(10) Patent No.: US 7,660,048 B1
(45) Date of Patent: Feb. 9, 2010

(54) WIDE ANGLE LENS WITH LARGE APERTURE

(75) Inventor: Valery V. Kozodoi, Lenoblast (RU)

(73) Assignee: ZAO "Impulse", St. Petersburg (RU)

( * ) Notice: Subject to any disclaimer, the term of this patent is extended or adjusted under 35 U.S.C. 154(b) by 0 days.

(21) Appl. No.: 12/338,081

(22) Filed: Dec. 18, 2008

(51) Int. Cl.
*G02B 9/00* (2006.01)
*G02B 9/64* (2006.01)

(52) U.S. Cl. .................... 359/754; 359/755

(58) Field of Classification Search .......... 359/749–755
See application file for complete search history.

(56) References Cited

U.S. PATENT DOCUMENTS

| | | | | |
|---|---|---|---|---|
| 3,736,049 | A * | 5/1973 | Shimizu | 359/750 |
| 5,724,195 | A | 3/1998 | Enomoto et al. | |
| 7,057,830 | B2 * | 6/2006 | Ebbesmeier | 359/755 |

FOREIGN PATENT DOCUMENTS

| | | |
|---|---|---|
| SU | 1649492 A1 | 5/1991 |
| SU | 1663596 A1 | 7/1991 |

OTHER PUBLICATIONS

Kozodoi, V. V., "Synthesis of a fast wide-angle photographic objective lens with the increased back focal length," Priborostrojenije, State Committee of the RF for higher education, Bulletin of higher education establishments, vol. 37, No. 2, Feb. 1994, pp. 72-74.

Volosov, D. S., "Photographic optics," M., Iskusstvo, 1978, pp. 458-459.

* cited by examiner

*Primary Examiner*—Jack Dinh
(74) *Attorney, Agent, or Firm*—Houston Eliseeva LLP

(57) ABSTRACT

The invention is aimed at providing a lens having a wider angle of view, increased relative aperture, and higher quality of images. To achieve this technical object, there is a wide-angle lens with a large relative aperture, which contains an aperture diaphragm and seven optical components arranged along the pathway of luminous radiation from the object to the image as follows: the first positive component, the second one, which is a negative meniscus having the concave surface facing the image side, the third negative component, the fourth and the fifth components, the sixth negative component, the seventh positive component, and the aperture diaphragm located between the fifth and the sixth components, wherein the fourth component has a negative power and is made up of two lenses cemented together, the first lens being a biconcave one and the second lens being a biconvex one, the fifth component is a biconvex lens having a positive power, the sixth component is a single biconcave lens, the seventh component is a meniscus with its concave surface facing the object, and after the seventh component several additional ones are introduced, i.e. the eighth component, which is a biconvex lens, the ninth component having a positive power, which is cemented of two lenses, of which the first is a negative meniscus with its concave surface facing the image, and the second one is positive, the tenth component, which is a negative meniscus with its convex surface facing the image, and the eleventh component having a positive power, which is built up of two lenses cemented together, the first lens being a positive biconvex one and the second lens being a negative biconcave one.

2 Claims, 2 Drawing Sheets

WIDE ANGLE LENS WITH LARGE APERTURE

FIELD OF THE INVENTION

The present invention relates to a wide-angle lens having a large relative aperture and can be applied, for instance, to the charge-coupled devices (CCD) to obtain visual information about the object being observed through the lens.

BACKGROUND OF THE INVENTION

A wide-angle hydro lens is known, comprising five components, of which the first one is a positive (converging) meniscus with its convex surface facing the object side, the second and the third ones are negative menisci, the fourth one is a negative meniscus cemented to a biconvex lens, the fifth component is a positive meniscus cemented to a negative one, and the sixth component is a biconvex lens. The lens demonstrates adequate correction of aberrations and features a considerable angle of view in water $2\omega=90°$ (in the air $2\omega=141°$).

The disadvantage of this lens is its insufficient relative aperture (1:2.8).

A fast lens "Electron-1" is known comprising eight components, the first of which is a negative meniscus cemented to a biconvex lens, the second one is a biconvex lens, the third one is a positive meniscus, the fourth component is a positive meniscus cemented to a negative one, the fifth one is a meniscus, the sixth one is a positive meniscus, the sevenths one is a biconvex lens, and the eighth component is a biconcave lens. This lens has a large relative aperture (1:0.75).

The limitation of this lens is its small field of view (2Y=180 mm) and an appreciable deterioration of image quality when shifting from the field of view center to its margin (from 0 mm to 180 mm).

A lens is known comprising seven optical components, of which the first two are negative menisci, the third one is a biconcave lens cemented to a biconvex lens, the fourth one is a biconvex lens, the fifth one is a diverging lens cemented to a biconvex one, the sixth component is a biconvex lens with its first surface on the way of optical radiation being aspherical, and the seventh one is a plane-parallel plate. This lens is characterized by a large relative aperture (1:0.8) and a substantial angle of view ($2\omega=62.3°$).

The drawbacks of this lens are its insufficient angle of view and application of the lens with an aspherical surface, which is not adaptable to a streamlined production.

The principles of developing wide-angle lenses are set forth in the paper. The paper presents the methods of selecting the schematic arrangement of the lens that would correspond to the specified parameters. The author describes the photographing lens and the projection lens developed according to the proposed methods. The schematic arrangement of the "Planar" type lens was accepted as a baseline configuration. The drawback of the mentioned lens was its poor light distribution. The basic configuration was supplemented by corrective elements of the wide-angle lenses "Mir" and "Russar". By means of introducing the power-corrective lens components the main planes of the lens were shifted towards the image plane in order to increase S'F', and the magnitude of negative distortion was reduced. The photographing lens (FIG. 1) mentioned in the paper was developed using this methods, and it is the closest one to the claimed invention in its essential technical features.

The author has been granted the inventor's certificate for that lens. The lens comprises the aperture diaphragm and seven optical components, of which the first one is a positive meniscus, the second and the third ones are negative menisci with their concave surfaces facing an image side, the fourth one is a positive meniscus, the fifth one is a negative meniscus with its concave surface facing an object side, the sixth component is a positive meniscus having the concave surface facing an object side, which is built up of a biconcave and a biconvex lenses cemented together, the seventh component is biconvex, and the aperture diaphragm is located between the fifth and the sixth components. The lens with its specified characteristics provides high image quality and adequately uniform light distribution. The disadvantages of this lens are its insufficient angle of view ($2\omega=53°$) and small aperture ratio (1:1.4).

The latter invention has been taken as a prototype.

SUMMARY OF THE INVENTION

The technical object of the present invention is to provide wider angle of view of the lens, increased relative aperture, and higher quality of images.

To achieve the technical object mentioned above, according to the present invention, there is a wide-angle lens with a large relative aperture, which contains an aperture diaphragm and seven optical components arranged along the pathway of luminous radiation from the object to the image as follows: the first positive component, the second component, which is a negative meniscus having the concave surface facing the image side, the third negative component, the fourth and the fifth components, the sixth negative component, the seventh positive component, and the aperture diaphragm located between the fifth and the sixth components, wherein the fourth component has a negative power and is made up of two lenses cemented together, the first lens being a biconcave one and the second lens being a biconvex one, the fifth component is a biconvex lens having a positive power, the sixth component is a single biconcave lens, the seventh component is a meniscus with its concave surface facing the object, and after the seventh component several additional ones are introduced, i.e. the eighth component, which is a biconvex lens, the ninth component having a positive power, which is cemented of two lenses, of which the first is a negative meniscus with its concave surface facing the image, and the second one is positive, the tenth component, which is a negative meniscus with its convex surface facing the image, and the eleventh component having a positive power, which is built up of two lenses cemented together, the first lens being a positive biconvex one and the second lens being a negative biconcave one.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been

DETAILED DESCRIPTION OF THE PREFERRED EMBODIMENTS

Figure 1:
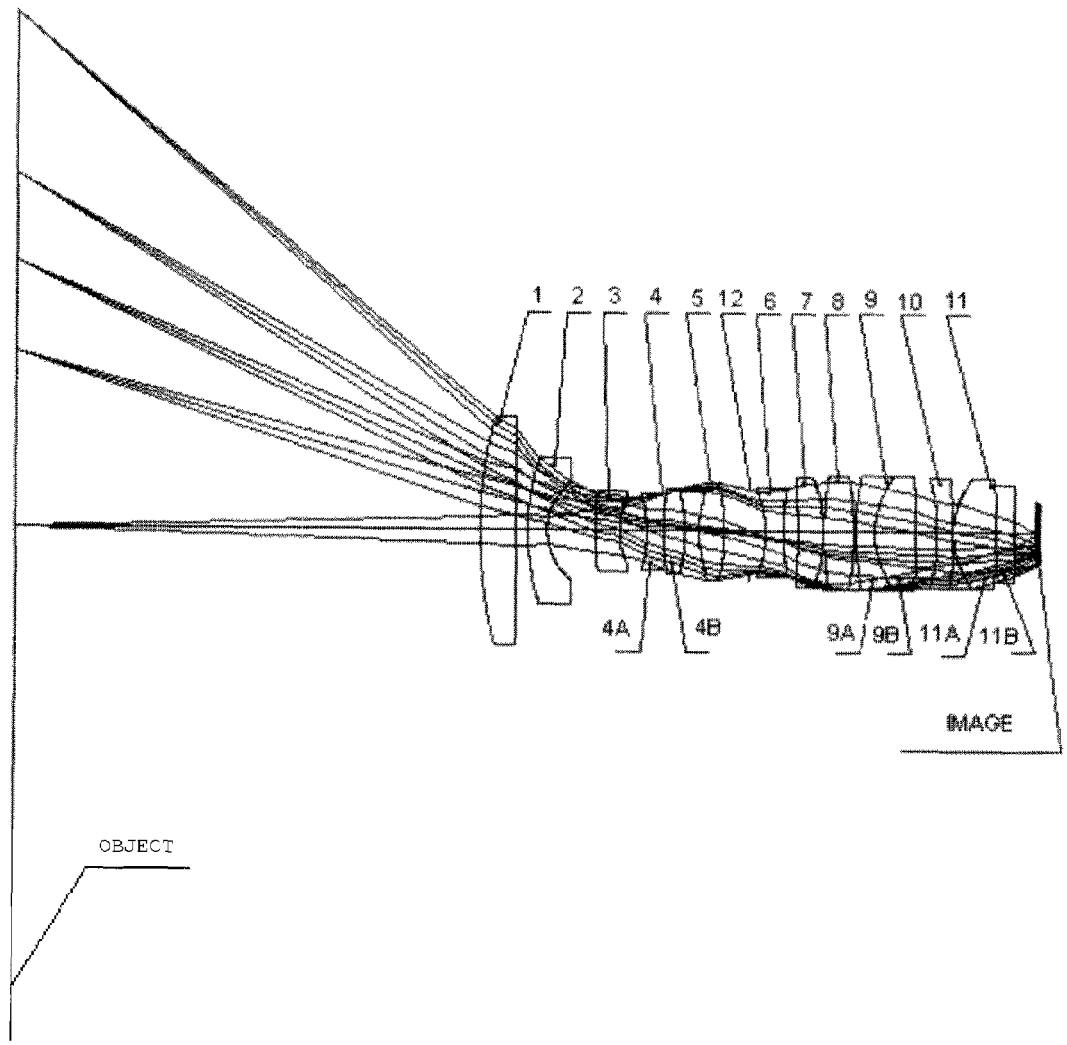
FIG. 1 is an optical train of the proposed lens arrangement.
Figure 2:
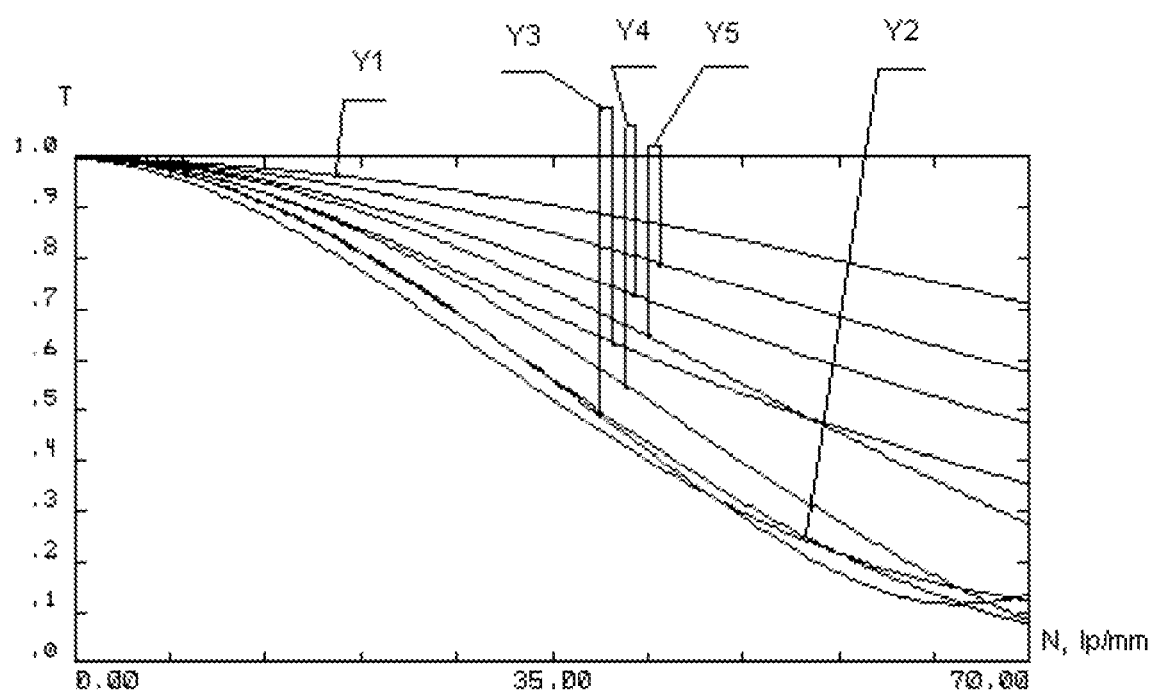
FIG. 2 shows the frequency-contrast curves, which demonstrate considerably improved image quality for the central area of the lens field of view (from Y1 to Y5) with practically no loss in image quality for the intermediate and marginal areas of the field of view (from Y2 to Y4). Here Y1=0, Y2=Ymax, Y3=0.7Ymax, Y4=0.5Ymax, Y5=0.4Ymax.

The proposed wide-angle lens with a large relative aperture contains eleven components arranged along the pathway of luminous radiation from the object to the image as follows: the first positive component 1, the second component 2, which is a negative meniscus having the concave surface facing the image side, the third negative component 3, the fourth 4 and the fifth 5 components, the sixth negative component 6, the seventh positive component 7, and the aperture diaphragm 12 is located between the fifth 5 and the sixth 6 components.

Here the fourth component 4 has a negative power and is made up of two lenses cemented together, of which the first lens 4A is a biconcave one and the second lens 4B is a biconvex one, the fifth component 5 is a biconvex lens having a positive power, the sixth component 6 is a single biconcave lens, and the seventh component 7 is a meniscus with its concave surface facing the object. After the seventh component 7 there are several additional ones, i.e. the eighth component 8, which is a biconvex lens, the ninth component 9 having a positive power, which is cemented of two lenses, the first one 9A being a negative meniscus with its concave surface facing the image, and the second one 9B being positive, the tenth component 10, which is a negative meniscus with its convex surface facing the image, and the eleventh component 11 having a positive power, which is built up of two lenses cemented together, the first lens 11A being a positive biconvex one and the second lens 11B being a negative biconcave one.

The lens operates as follows. The luminous flux from the object passes successively through all the components up to the aperture diaphragm 12, which cuts out its useful part corresponding to the relative aperture, further passes through all the components positioned after the aperture diaphragm 12 and forms an image in the image plane of the lens, where the optical radiation detector is installed, such as a CCD-matrix.

The modified and additional components of the proposed lens as compared to the prototype lens make it possible to resolve the following problems. The fact that the fourth component 4 has a negative power allows reducing the clear aperture of the lenses arranged before it, whereas the angle of view of the lens is increased, and introduces a positive aberration of the image field curvature into the general contribution of lens components; the fact that this component is cemented of the two lenses 4A and 4B makes it possible to correct the spherochromatic aberration and the chromatic aberration of magnification. The fifth component 5 is made biconvex, what allows correcting the higher-order spherical aberrations. The sixth component 6 is a single biconcave lens, what enables correction of spherical aberration, curvature of the field of view, astigmatism and lump aberration. The fact that the seventh component 7 is a positive meniscus with the concave surface facing the object permits correcting the astigmatism aberration and developing the relative aperture of the lens. The eighth component 8, which is a biconvex lens, develops the relative aperture of the lens. The ninth component 9, which has a positive power and is cemented of two lenses, the first lens 9A being a negative meniscus with its concave surface facing the image and the second lens 9B being a positive lens, makes it possible to correct spherochromatic aberration, spherical aberration and chromatic magnification aberration. The tenth component 10, i.e. a negative meniscus with the convex surface facing the image, corrects the field of view curvature and astigmatism. And the eleventh component 11, which has a positive power and is cemented of the two lenses, the first lens 11A being a positive biconvex one and the second lens 11B being a negative biconcave one, corrects the distortion aberrations, chromatic aberrations of position and magnification, and aberrations of wide oblique bundles of rays.

The applicant developed a prototype lens having the focal distance of 21.7 mm, angle of view 2ω=82°, and aperture ratio 1:1.06.

The applicant manufactured pilot samples of the proposed lens, which demonstrated improved performance characteristics.

While this invention has been particularly shown and described with references to preferred embodiments thereof, it will be understood by those skilled in the art that various changes in form and details may be made therein without departing from the scope of the invention encompassed by the appended claims.

What is claimed is:

1. A wide-angle lens with a large relative aperture, comprising:
   an aperture diaphragm and a plurality of optical components arranged along the pathway of radiation from an object to an image;
   a positive first component, a second component comprised of a negative meniscus having a concave surface facing an image side, a negative third component, a negative fourth component comprised of a biconcave lens and a biconvex lens joined together, a positive fifth component comprising a biconvex lens, a negative sixth component comprised of a single biconcave lens, a positive seventh component having a meniscus with its concave surface facing the object; and
   the aperture diaphragm located between the fifth and the sixth components.

2. The lens of claim 1, further comprising an eighth component being a biconvex lens, a positive ninth component comprised of a negative meniscus with its concave surface facing the image and a positive lens joined together, a tenth component comprised of a negative meniscus with its convex surface facing the image, and a positive eleventh component comprised of a positive biconvex lens and a negative biconcave lens joined together.

* * * * *